United States Patent
Andersen et al.

(10) Patent No.: US 9,889,580 B2
(45) Date of Patent: Feb. 13, 2018

(54) TURNING DEVICE FOR TURNING A FIRST MOULD PART FOR MANUFACTURING A WIND TURBINE BLADE PART RELATIVE TO A SECOND MOULD PART

(71) Applicant: LM WP PATENT HOLDINGS A/S, Kolding (DK)

(72) Inventors: Jeppe Tylvad Andersen, Odense C (DK); Anja Dücher Spandet Christiansen, Odense SØ (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 15/529,825

(22) PCT Filed: Nov. 26, 2015

(86) PCT No.: PCT/EP2015/077770
§ 371 (c)(1),
(2) Date: May 25, 2017

(87) PCT Pub. No.: WO2016/083504
PCT Pub. Date: Jun. 2, 2016

(65) Prior Publication Data
US 2017/0326758 A1 Nov. 16, 2017

(30) Foreign Application Priority Data

Nov. 27, 2014 (EP) ..................................... 14195185

(51) Int. Cl.
*B29C 33/28* (2006.01)
*B29C 33/30* (2006.01)
(Continued)

(52) U.S. Cl.
CPC .............. *B29C 33/28* (2013.01); *B29C 33/30* (2013.01); *F03D 13/10* (2016.05); *B29L 2031/085* (2013.01); *F03D 1/06* (2013.01)

(58) Field of Classification Search
CPC ................................ B29C 33/26; B29C 33/28
See application file for complete search history.

(56) References Cited

U.S. PATENT DOCUMENTS

| 6,290,202 | B1 * | 9/2001 | Rindoks | .............. | B29C 33/0088 |
| | | | | | 249/129 |
| 2016/0375631 | A1 * | 12/2016 | Encinosa | ................ | B29C 33/26 |
| | | | | | 156/91 |

FOREIGN PATENT DOCUMENTS

| DE | 10 2010 049 502 A1 | 5/2012 |
| EP | 2 305 998 A2 | 4/2011 |

(Continued)

OTHER PUBLICATIONS

Interntional Search Report dated Mar. 14, 2016 issued in corresponding International Application No. PCT/EP2015/077770.

(Continued)

*Primary Examiner* — Ryan Ochylski
(74) *Attorney, Agent, or Firm* — Nath, Goldberg & Meyer; Jerald L. Meyer; Tanya E. Harkins

(57) ABSTRACT

A turning device, for manufacturing wind turbine blades and turning moulds relative to each other, having a base, a rotational part movable relative to the base on an rotational axis, a first linear actuator with first and second ends, the first end attaching to the base, and the second end attaching to the rotational part at a first anchor point on a first turning axis, and a second linear actuator having first and second ends, the first end attaching to the base, and the second end attaching to the rotational part at a second anchor point on a second turning axis. The first turning axis is a first distance from the rotation axis and is moved on a first arc on the rotation axis, (Continued)

Figure 1:
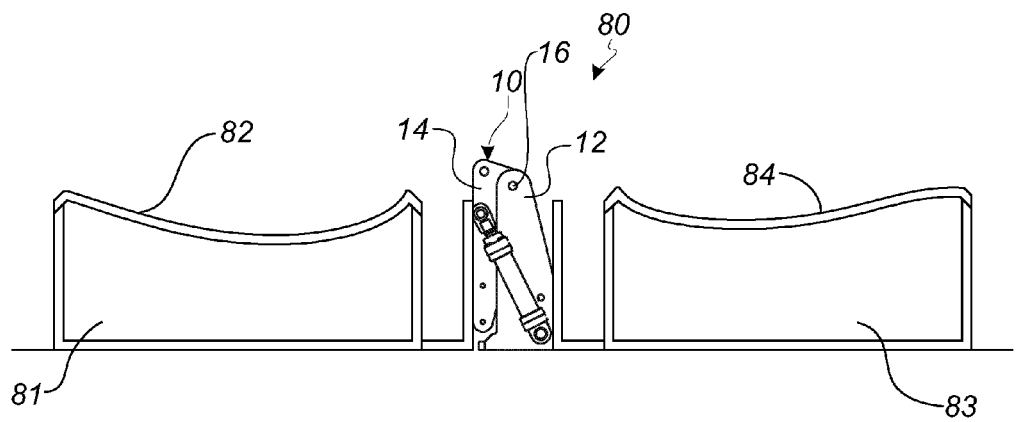

and the second turning axis is a second, different distance from the rotation axis and is moved along a second arc on the rotation axis.

15 Claims, 5 Drawing Sheets

(51) Int. Cl.
*F03D 13/10* (2016.01)
*F03D 1/06* (2006.01)
*B29L 31/08* (2006.01)

(56) References Cited

FOREIGN PATENT DOCUMENTS

| EP | 2 380 720 A1 | 10/2011 |
|---|---|---|
| WO | 2004/043679 A1 | 5/2004 |
| WO | 2008/054088 A1 | 5/2008 |

OTHER PUBLICATIONS

European Search Report dated May 5, 2015 issued in corresponding European Application No. EP 14195185.

* cited by examiner

TURNING DEVICE FOR TURNING A FIRST MOULD PART FOR MANUFACTURING A WIND TURBINE BLADE PART RELATIVE TO A SECOND MOULD PART

This is a National Phase Application filed under 35 U.S.C. 371 as a national stage of PCT/EP2015/077770, filed Nov. 26, 2015, an application claiming the benefit of European Application No. 14195185.5, filed Nov. 27, 2014, the content of each of which is hereby incorporated by reference in its entirety.

FIELD OF THE INVENTION

The present invention relates to a turning device for turning over a first mould part relative to a second mould part. The invention also relates to a mould assembly for manufacturing a wind turbine blade part comprising such a turning device. The invention further relates to a post-moulding station for carrying out post-moulding operations on wind turbine blade parts and which comprises such a turning device.

BACKGROUND OF THE INVENTION

Wind turbine blades have become increasingly longer of the years and may today have a length of 80 meters or more and may weigh tens of tons. The wind turbine blades are often manufactured as separate shell parts, e.g. as a pressure side shell part and a suction side shell part, which afterwards are assembled to form a complete aerodynamic blade shell. This can for instance be carried out via the mould parts, in which the shell parts are manufactured, or in a post-moulding station, e.g. provided with two cradles for receiving and carrying the blade shell parts.

The shell parts are assembled by gluing the shell parts at the leading edge and the trailing edge and require that one of the mould parts or cradles are turned over along with the carried blade shell part and aligned with the other mould part or cradle and other blade shell part. Therefore, the mould assembly or post-moulding station are provided with a turning system comprising a number of turning devices that allow a rotatable mould part or rotatable cradle to be turned over and closed against a fixed side mould part or fixed side cradle.

Due to the large size and weight of the blade shell parts and the moulds or cradles, the turning devices need to be able to provide a relative high moment of force during the turnover action. Further, it may be advantageous to design the turning system such that the required rotation height is limited in order to ensure that the mould part or cradle may be turned over without coming into contact with the ceiling of the manufacturing facility. The turning system may for instance be based on planet gears or hydraulics.

WO04043679 discloses a mould assembly, where the disclosed turning system is based on a gear system, such as a planet gear system.

WO08054088 discloses a mould assembly provided with a turning system that allows the rotating side mould to be rotated about two hinge axes in order to lower the overall rotation height during the turnover action.

WO12055395 similarly discloses a mould assembly provided with a pivoting system that allows the rotating side to be pivoted about a first rotary bearing and a second rotary bearing. At least the first rotary bearing is arranged in a distance from the standing surface of the stationary mould part.

EP2380720 also discloses a mould assembly where a rotating side mould may be rotated about two hinge axes in two rotation steps. During at least a part of the first rotation step, the rotating side mould undergoes a combined rotational and translational movement.

The known turning systems are rather bulky or expensive, since they are dimensioned with a large overhead for the required moment of force during the turnover action.

SUMMARY OF THE INVENTION

It is an object of the invention to obtain a turning device as well as a mould assembly or post-moulding station, which overcome or ameliorate at least one of the disadvantages of the prior art or which provide a useful alternative.

According to a first aspect, the invention provides a turning device for turning a first mould part for manufacturing a wind turbine blade part relative to a second mould part for manufacturing a wind turbine blade part or a first post-moulding station part relative to a second post-moulding station part, wherein the turning device comprises:
  a base part,
  a rotational part, which is rotational movable relative to the base part about a rotation axis,
  a first linear actuator having a first end and a second end, wherein the first end is attached to the base part, and the second end is attached to the rotational part at a first anchor point arranged on a first turning axis,
  a second linear actuator having a first end and a second end, wherein the first end is attached to the base part, and the second end is attached to the rotational part at a second anchor point arranged on a second turning axis, wherein
  the first turning axis is arranged at a first distance from the rotational axis such that the first turning axis during turning is moved along a first arc of circle about the rotation axis, and
  the second turning axis is arranged at a second distance from the rotation axis such that the second turning axis during turning is moved along a second arc of circle about the rotation axis, wherein
  the second distance is different than the first distance.

Accordingly, it is seen that the invention provides a turning device (which may also be denoted a turnover device or a closing device), where different linear actuators, such as hydraulic or pneumatic cylinders, engage the rotational or turning part at different distances from the rotation axis of the turning device. Accordingly, the different engagement points are moved at different arcs of circle relative to the rotation axis. This provides the turning device with larger degrees of movement, which in turn makes it possible to minimise the width of the device. Further, by having the second distance or second arc of circle being larger than the first distance or first arc of circle, the efficiency of the system may be increased, whereby it is possible to use smaller linear actuators, which in turn makes it possible to lower the overall cost of the device. Finally, the larger degrees of movement also make it possible to let the asserted moment of force be closer to the required moment of force. Thus, the device may be designed with a lower overhead, which again makes it possible to use smaller linear actuators.

The second distance or curvature radius is advantageously larger than the first distance or curvature radius.

The first mould part and the first post-moulding station part may also be called the turning side mould part and the turning side post-moulding station part, respectively. The second mould part and the second post-moulding station part may also be called the fixed side mould part and the fixed side post-moulding station part, respectively.

The turning device is preferably suitable for turning over mould parts or post-moulding station parts having a length of at least 30 meters, or at least 40 meters. Further, the turning device is preferably suitable for turning over the mould part or post-moulding station part including composite structures arranged on the mould part or post-moulding station part having a total weight of at least 10 tons, or at least 20 tons.

The turning device is adapted to turn over the first mould part relative to the second mould part, i.e. turning the first mould part approximately 180 degrees.

According to a second aspect, the invention provides a turning device for turning a first mould part for manufacturing a wind turbine blade part relative to a second mould part for manufacturing a wind turbine blade part or a first post-moulding station part relative to a second post-moulding station part, wherein the turning device comprises:
 a base part,
 a rotational part, which is rotational movable relative to the base part about a rotation axis,
 an odd number of linear actuators having first ends attached to the base parts and second ends attached to the rotational part.

The linear actuators are arranged so that the linear motion of the linear actuators may turn over the first mould part or first post-moulding station part, i.e. turning the part approximately 180 degrees.

According to the second aspect, the odd number of linear actuators preferably contains: one first linear actuator having a first end and a second end, wherein the first end is attached to the base part, and the second end is attached to the rotational part at a first anchor point arranged on a first turning axis, and two second linear actuators having a first end and a second end, wherein the first end is attached to the base part, and the second end is attached to the rotational part at a second anchor point arranged on a second turning axis.

The first turning axis and the second turning axis may be arranged in the same distance from the rotation axis, such that the two turning axes are moving along the same arc of circle. Alternatively, the two turning axes may be arranged at different distances from the rotation axis, so that they are moved along different arcs of circles about the rotation axis.

The new design with three linear actuators or an odd number of linear actuators makes it possible to a further degree to design the asserted moment of force of the turning device, whereby the device may be designed with a lower overhead, which again makes it possible to use smaller linear actuators.

Overall, the combined effect of using three linear actuators (or an odd number of actuators) makes it possible to a larger degree to design the asserted moment of force during the turnover action than existing systems. Thereby, the turnover device or system may be designed with a smaller overhead, allowing the device to have a smaller width and using smaller linear actuators.

In the following, embodiments relating to both the first aspect and the second aspect are described.

In an advantageous embodiment, the first linear actuator and/or the second linear actuator are hydraulic cylinders. The cylinders are preferably equipped with a pressure-holding valve to prevent accidental releasing of pressure. In principle, it is also possible to use other types of linear actuators, such as pneumatic or electric cylinders.

In another advantageous embodiment, the turning device comprises an additional second linear actuator having a first end and a second end, wherein the first end is attached to the base part, and the second end is attached to the rotational part at an additional second anchor point arranged on the second turning axis. Accordingly, the turning device may advantageously contain one first linear actuator and two second linear actuators.

The turning device may comprise an odd number of first linear actuators and an even number of second linear actuators (or vice versa).

In one embodiment, the first end of the first linear actuator is attached to a first anchor point of a first base axis, and wherein the first end of the second linear actuator is attached to a second anchor point of a second base axis. The first base axis and the second base axis may be a common base axis, or the two axes may be separate. Accordingly, it is seen that the linear actuators may be anchored with their first ends to the same base axis of the base part. This may for instance be achieved by the first ends being attached to a common pin or shaft. In order to provide the turning movement, the first ends may be rotationally coupled to the common pin or shaft.

The linear actuators are preferably arranged axially next to each other. Accordingly, the actuators are arranged next to each other as seen in the axial direction of the device (or along the rotation axis of the system). Preferably, the rotation axis, the turning axes, and the base axes are oriented parallel to each other.

In a highly advantageous embodiment, first linear actuators and second linear actuators are arranged in a symmetric arrangement. For the embodiment having one first linear actuator and two second linear actuators, this means that the first linear actuator is arranged between the two second linear actuators. Such a symmetric arrangement ensures that the asserted forces during the turning action are balanced and distortion is minimised.

In one embodiment, the second distance is at least 2% larger than the first distance (or vice versa). The second distance may also be at least 3%, 4%, 5%, 6%, 7%, 8%, 9%, or 10% larger than the first radius (or vice versa).

In one embodiment, the turning device is adapted to adjust the vertical position of the rotation axis during a turning sequence. This may for instance be carried out via a linear actuator, which may adjust the height of the device and/or the position of the rotation axis. Thereby, it is possible to lower the maximum height of the turning side mould part or post-moulding station part during the turning mechanism, whereby the ceiling height may be lower. This is particularly relevant for very large wind turbine blades, which today may have a length of more than 80 meters. The moulds may have a large width and a large height, especially if the moulds are for manufacturing prebent blades, which thus requires a large maximum height during the turning action.

In a highly advantageous embodiment, the rotational part is provided with an attachment device for attachment to a first wind turbine blade mould part or a first wind turbine blade post-moulding station part. The attachment device is adapted to be detachably coupled with the first wind turbine blade mould part or the first wind turbine blade post-moulding station part.

The base part may be adapted to be attached to a second wind turbine blade mould part or a second wind turbine blade post-moulding station part (or fixed side parts), alternatively to the floor of a workshop.

According to a third aspect, the invention provides a wind turbine blade part mould assembly having a longitudinal direction and comprising:
- a first mould part for manufacturing a first wind turbine blade part,
- a second mould part for manufacturing a second wind turbine blade part, and
- a number of turning devices according to any of the aforementioned embodiments, the turning devices being arranged along the longitudinal direction of the wind turbine blade part mould assembly, wherein
- the rotational parts of the turning devices are attached to the first mould part, such that the first mould part may be turned relative to the second mould part.

The first wind turbine blade part may for instance be a first blade shell part, e.g. a pressure side shell of a wind turbine blade, and the second wind turbine blade part be a second blade shell part, e.g. a suction side shell of wind turbine blade.

In an advantageous embodiment, the mould assembly comprises at least two turning devices, and preferably at least three turning devices arranged along the longitudinal direction of the wind turbine blade mould assembly with a mutual longitudinal spacing.

Accordingly, it is seen that the mould assembly may be used for manufacturing two blade shell parts via methods that are known per se and that the turning devices may be used for closing the mould assembly, such that the blade parts may be adhered to each other, e.g. along the leading edge and trailing edge of the blade shell for instance via glue flanges.

The assembly comprises at least one turning device at a first end and a second turning device at a second end of the assembly, and preferably a third turning device at an intermediate position.

The assembly may comprise 2-15 turning devices, advantageously 2-10 turning device, and more advantageously 3-10 turning devices. Accordingly, the turning devices may be arranged with a longitudinal spacing of 5-30 meters.

Similarly, the turning devices may be used for a post-moulding station. Accordingly, the invention in a fourth aspect provides a post-moulding station having a longitudinal direction and comprising:
- a first cradle,
- a second cradle, and
- a number of turning devices according to any of the aforementioned embodiments, the turning devices being arranged along the longitudinal direction of the post-moulding station, wherein
- the rotational parts of the turning devices are attached to the first cradle, such that the first cradle may be turned relative to the second cradle.

Similar to the mould assembly, the turning devices may be arranged with a similar spacing along the station. Further, the first cradle may be adapted to receive and carry a first blade shell part, e.g. the pressure side shell part, and the second cradle be adapted to receive and carry a second blade shell part, e.g. the suction side shell part.

The post-moulding station may comprise 2-15 turning devices, advantageously 2-10 turning device, and more advantageously 3-10 turning devices. Accordingly, the turning devices may be arranged with a longitudinal spacing of 5-30 meters.

The turning devices may be attached to the mould parts or post-moulding station parts via any conventional means, such as pins. The connections may be released once the turnover action has completed, i.e. when the turning side part is arranged above the fixed side part.

The mould assembly and the post-moulding station may in a common term be called a wind turbine blade part manufacturing station. Accordingly, the invention in a broader sense provides a wind turbine blade part manufacturing station having a longitudinal direction and comprising:
- a first manufacturing station part for handling a first wind turbine blade part,
- a second manufacturing station part for handling a second wind turbine blade part,
- a number of turning devices according to any of the aforementioned embodiments, the turning devices being arranged along the longitudinal direction of the wind turbine blade part manufacturing station, wherein
- the rotational parts of the turning devices are attached to the first manufacturing station part, such that the first manufacturing station part may be turned relative to the second manufacturing station part.

DESCRIPTION OF THE INVENTION

Figure 2:
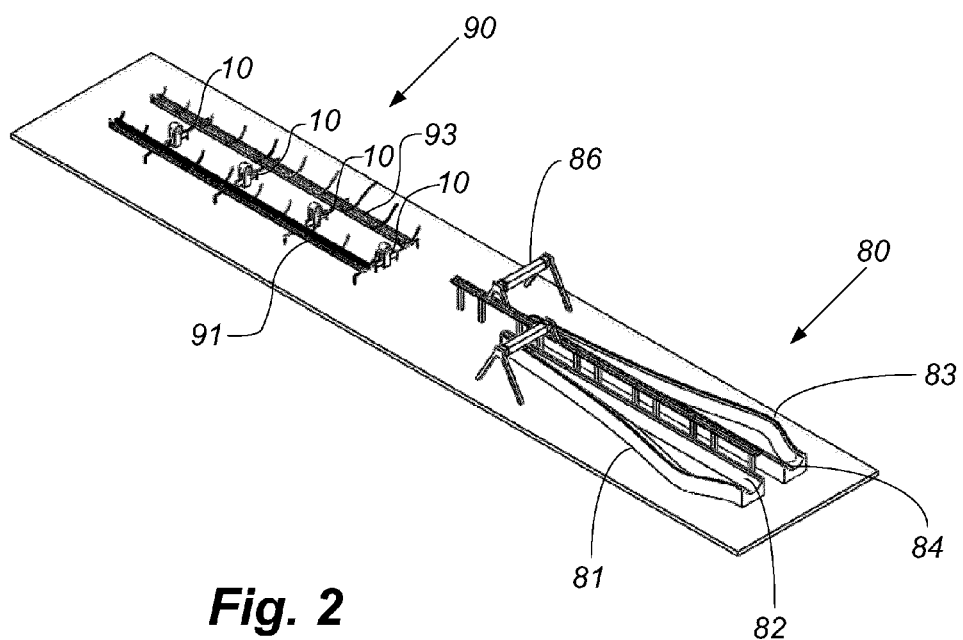
Figure 3:
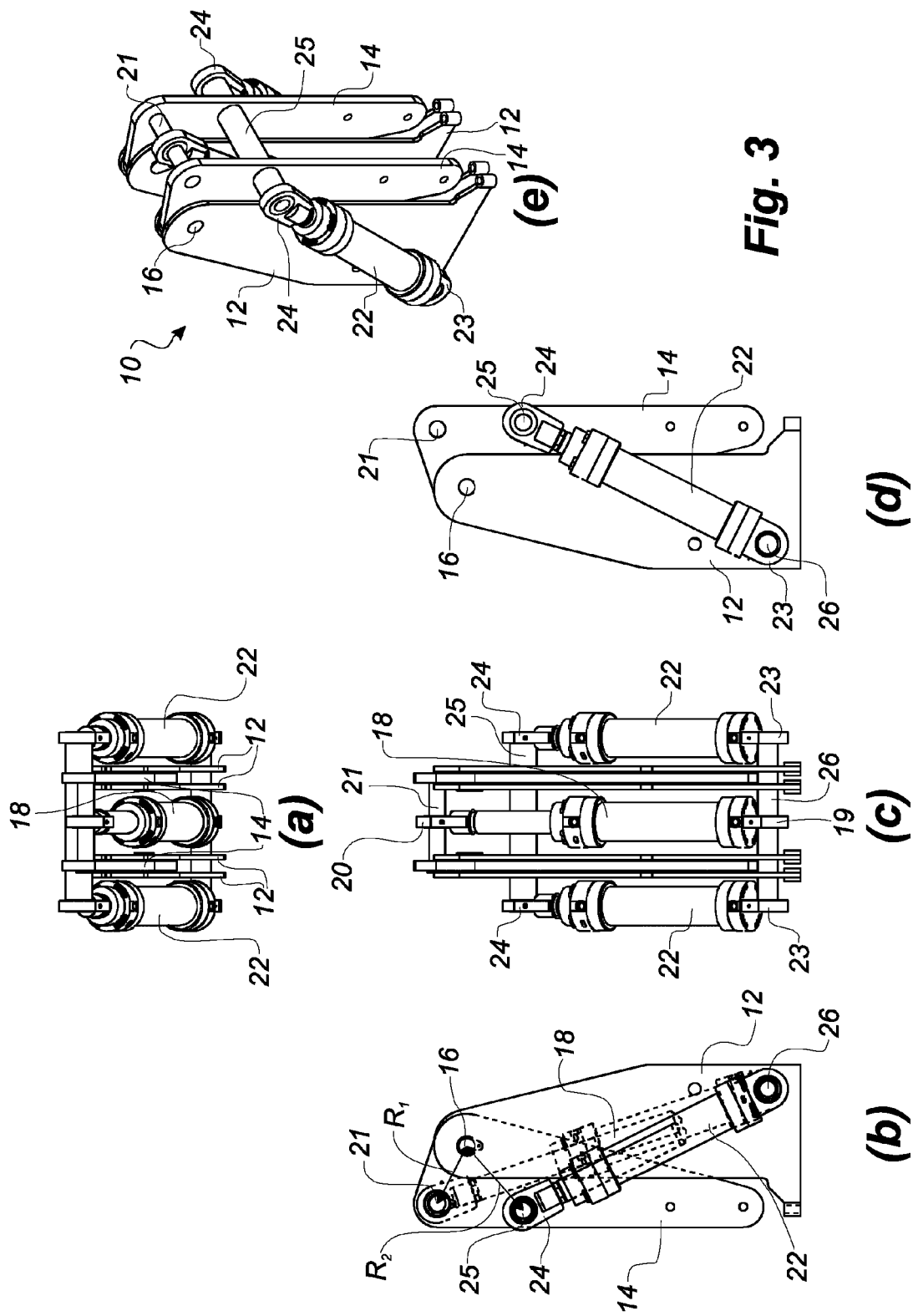
Figure 4:
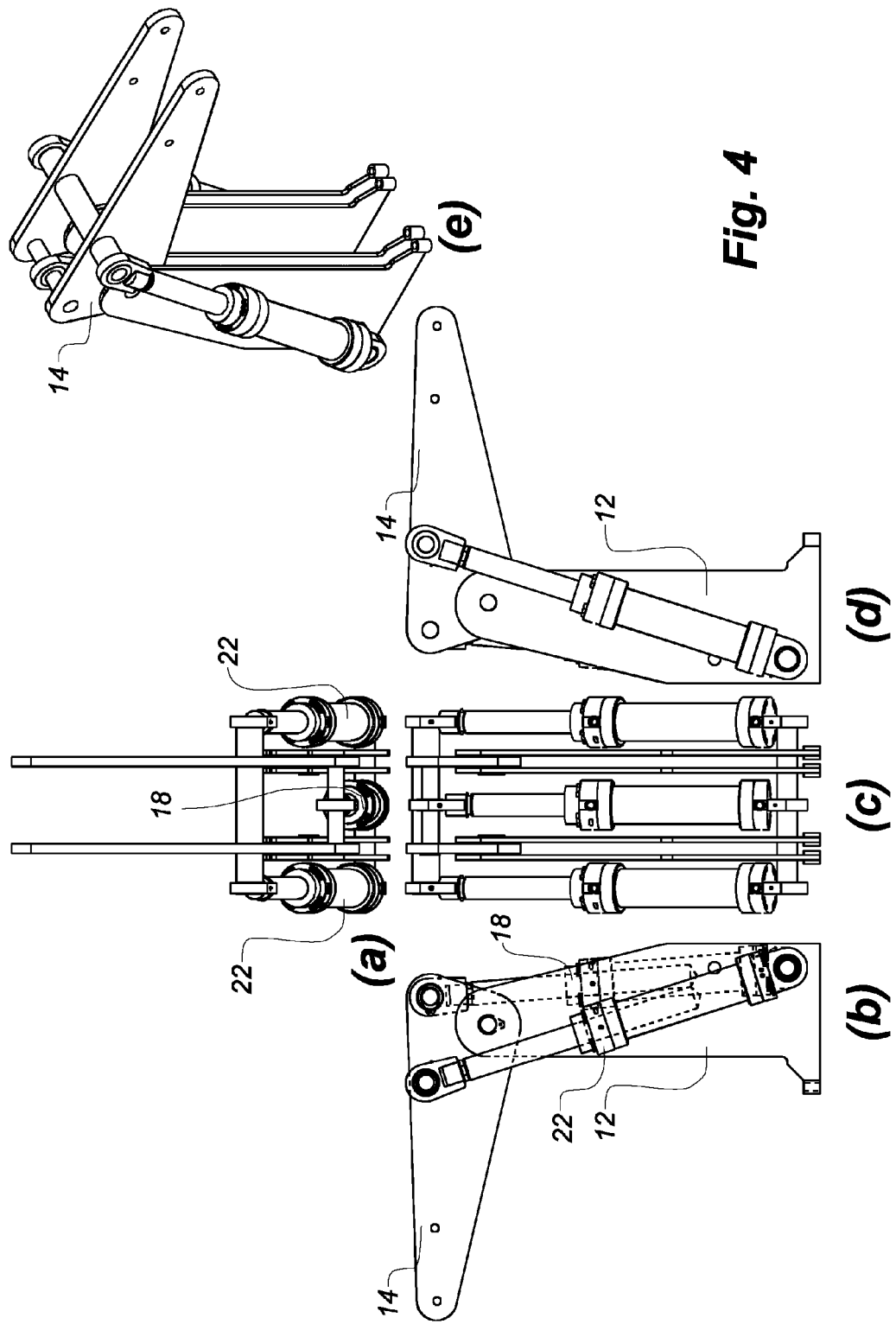
Figure 5:
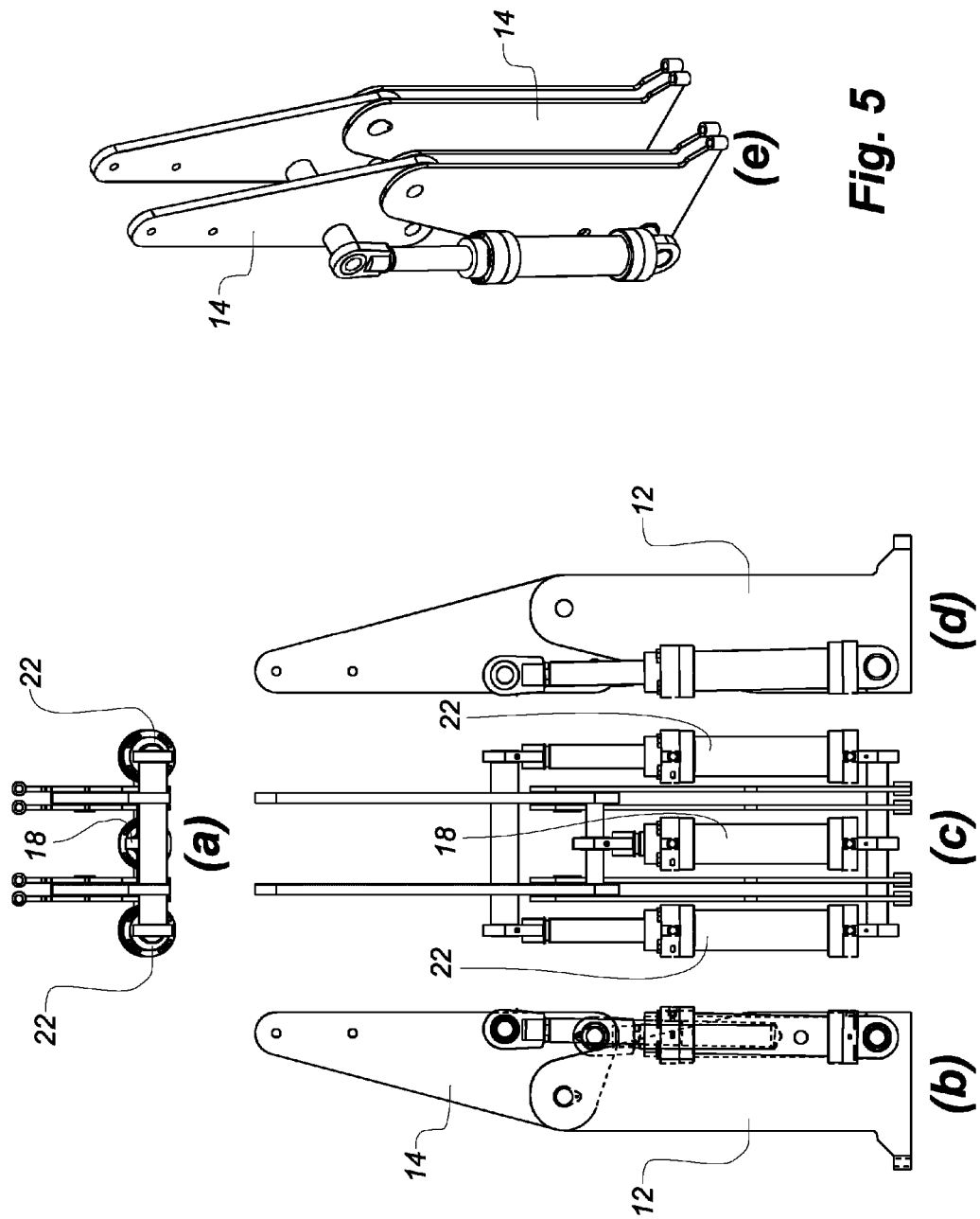
Figure 6:
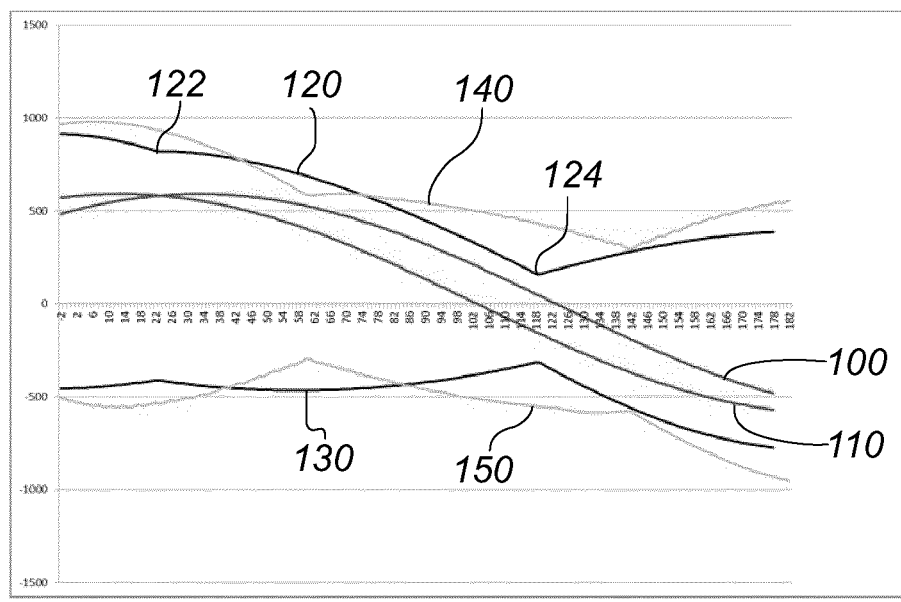

The invention is explained in detail below with reference to an embodiment shown in the drawings, in which FIG. 1 shows a mould assembly according to the invention, FIG. 2 shows an overview of a manufacturing system according to the invention, FIG. 3 shows different views of a turning device according to the invention in a first position during a turning process, FIG. 4 shows different views of the turning device according to the invention in a second position during a turning process, FIG. 5 shows different views of the turning device according to the invention in a third position during a turning process, and FIG. 6 shows the asserted moment of force of the turning device during the turning process compared to a prior art turning device.

DETAILED DESCRIPTION

Wind turbine blades are often manufactured as separate shell parts, e.g. as a pressure side shell part and a suction side shell part, which afterwards are assembled to form a complete aerodynamic blade shell. This can for instance be carried out via the mould parts, in which the shell parts are manufactured, or in a post-moulding station, e.g. provided with two cradles for receiving and carrying the blade shell parts.

The shell parts are assembled by gluing the shell parts at the leading edge and the trailing edge and require that one of the mould parts or cradles are turned over along with the carried blade shell part and aligned with the other mould part or cradle and other blade shell part.

The present invention in general relates to a turning device for use in a turning system for a wind turbine blade part manufacturing station, the wind turbine blade part manufacturing station being a blade moulding station or a post-moulding station.

FIG. 1 shows a first embodiment of a wind turbine blade part manufacturing station in form of a mould assembly 80 or moulding station. The mould assembly 80 comprises a first mould part 81 for manufacturing a first wind turbine shell part, e.g. a pressure side shell. The first mould part 81 comprises a first moulding surface 82, which defines an outer part of the first wind turbine blade shell part. The mould assembly 80 further comprises a second mould part 83 for manufacturing a second wind turbine shell part, e.g. a suction side shell. The second mould part 83 comprises a second moulding surface 84, which defines an outer part of the second wind turbine blade shell part.

Fibre-reinforcement material as well as possible core material is arranged on the moulding surfaces 82, 84 of the mould parts 81, 83, after which a curable resin is infused into mould cavities formed by the mould parts 81, 83 and vacuum bags (not shown), which are subsequently cured.

In a next step, the cured wind turbine blade shell parts are adhered to each other. This is carried out by applying glue to the leading edge and trailing edge (and along a not shown glue flange), after which the first mould part 81 along with the first wind turbine blade shell part is turned over and aligned with the second mould part 83 and second wind turbine blade shell part, such that the two wind turbine blade shell parts are adhered to each other along the leading edge and trailing edge.

The two mould parts 81, 83 are arranged parallel to each other. In order to turning the first mould part 81 over, a plurality of turning devices 10 according to the invention are arranged along the longitudinal direction of the two mould parts 81, 83. The turning devices 10 each comprise a stationary base part 12 and a rotational part 14, which is rotational movable relative to the base part 12 about a rotation axis 16. The base part 12 is attached or at least fixedly arranged with respect to the second mould part 83, and the rotational part 14 is attached to the first mould part 81, such that the first mould part 81 may be turned relative to the second mould part 83. The base part 12 and the rotational part 14 are preferably detachably coupled to the second mould part 83 and first mould part 81, respectively.

An overview of a manufacturing system for a wind turbine blade according to the invention is illustrated in FIG. 2, wherein the manufacturing of the blade shell parts and the gluing steps is carried out at different work stations. The manufacturing system comprises a blade moulding station (indicated at 80) and a post-moulding station (indicated at 90). The blade moulding station 80 comprises a set of first and second blade shell moulds 81, 83. The blade shell moulds comprise respective first and second internal moulding surfaces 82, 84 which are arranged to produce first and second shaped blade shells having an aerodynamic profile substantially corresponding to respective upwind (or pressure-side) and downwind (or suction-side) halves of a wind turbine blade.

During manufacture of a wind turbine blade, a lay-up operation is performed at the blade moulding station 80, wherein a plurality of layers of a preferably fibre-based composite material are applied to the internal moulding surfaces 82, 84 of the blade moulds 81, 83. The fibre layers are applied to conform to the mould shape, and may be arranged at various thicknesses or densities dependent on the structural requirements of the wind turbine blade to be manufactured.

In the embodiment shown in FIG. 2, the blade moulding station 80 is provided with an automatic fibre lay-up apparatus 86, which allows for machine-controlled lay-up of the layers of fibre-based material in the blade moulds 81, 83. The automatic fibre lay-up apparatus comprises at least one fibre applicator device suspended on a moveable gantry provided above the blade moulds 81, 83, the at least one fibre applicator device operable to move along the length of the blade moulds 81, 83 to apply fibre layers, e.g. fibre tape, to the internal moulding surfaces 82, 84 of the blade moulds 81, 83.

However, it will be understood that the manufacturing system of the invention may be implemented using any suitable lay-up mechanism, e.g. hand lay-up. Furthermore, the lay-up operation may comprise the use of pultruded elements or pre-pregs of composite material within the blade moulds, either as an alternative to or in addition to the layers of fibre-based material.

Once sufficient layers of the fibre-based material have been applied to the surfaces of the moulds 81, 83, a curing operation is performed to cure the fibre layers to a relatively hardened state. In one embodiment, this may comprise applying a cover or vacuum bag over the fibre layers to form a container, and subsequently applying a vacuum pressure to the interior of the container defined by the vacuum bag and the surface of the blade mould 81, 83.

A curing resin is then infused or injected into the interior of the container, the resin spreading throughout the fibre layers by the action of the vacuum pressure. The resin is then allowed to cure and accordingly harden and join the layers of fibre-based material into a blade shell (not shown), having a structural profile corresponding to the shape of the surface of the blade moulds 81, 83.

The term "cured blade shells" is used herein to refer to blade shells which have been substantially cured by the curing operation, preferably to a level where the blade shells can be handled without undergoing significant deformation of the shell structure. The duration of the curing operation performed will depend on the type of curing resin used in the manufacture of the blade shells, but may be of the order of 2-3 hours using standard resins. However, it will be understood that the blade shells themselves may continue to undergo a curing process within the body of the blade shells for several hours after the denoted curing operation.

Accordingly, once the blade shells have substantially cured, the associated cover or vacuum bag may be removed, and the cured blade shells can be demoulded from the blade moulds 81, 83. To demould the blade shells, any manufacturing equipment which may be provided above the blade moulds 81, 83, e.g. automatic fibre applicator devices 86, may be removed, and a lifting apparatus (not shown) may be positioned above the blade shells contained in the blade moulds 81, 83. The lifting apparatus is operable to lift the cured blade shells out of the blade moulds 81, 83, and to transfer the cured blade shells to the post-moulding station 90, where additional post-moulding operations may be performed.

The transferring operation may be performed using any suitable lifting apparatus for the transferral of a wind turbine blade shell, e.g. a vacuum lifting device, a crane, a manual lifting operation, etc.

Examples of post-moulding operations which can be performed at the post-moulding station 90 on the blade shells can include, but are not limited to: a blade shell repair operation, involving a repair of any minor defects in a cured blade shell; a blade shell cutting or grinding operation, wherein a portion of a surface of the cured blade shell can be cut away or ground to present a relatively smooth profile; a blade root flange coupling operation, wherein a pair of blade root flanges which are provided on first and second blade shells are coupled together to form a single integral blade root flange; a gluing operation, wherein an adhesive is applied to a surface of a blade shell to bond components or blade shells together; a coating operation, wherein an external surface of a blade shell is coated with a coating layer, e.g.

a gel coat or suitable erosion resistant material; a laminate installation operation, wherein a main laminate or other element of the interior of a wind turbine blade may be fixed to an internal surface of one of the blade shells for positioning in the interior of a wind turbine blade; an overlamination operation; installation of internal blade components, e.g. load or deflection monitoring sensors, lightning protection systems, etc.; a survey of blade shell geometry; a secondary curing operation in, for example, an oven; or any other suitable manufacturing or assembly operations.

In a manufacturing setup utilising a blade moulding station 80 and a post-moulding station 90, the post-moulding station may comprise first and second blade cradles 91, 93 which are hingedly connected to each other, wherein a first blade cradle can be rotated relative to a second blade cradle, such that respective blade shells held in said first and second cradles can be closed and bonded together to form a wind turbine blade. The rotation or turnover of the first cradle 91 relative to the second cradle 93 is carried out by a number of turning devices 10 according to the invention, and which are distributed along the longitudinal direction of the post-moulding station 90. The turning system preferably comprises at least one turning device 10 arranged at one end of the post-moulding station 90 (e.g. at a blade root end), and one turning device 10 arranged at the other end of the post-moulding station 90 (e.g. at a blade tip end). The turning system also preferably comprises at least one intermediately arranged turning device 10.

As a result of performing these post-moulding operations at the post-moulding station 90, the blade moulds 81, 83 are now released from the production time associated with the above post-moulding operations, which traditionally have been performed with the blade shells retained in the blade moulds 81, 83. Accordingly, the use of a post-moulding station 90 to receive blade shells from a blade moulding station allows for the blade moulds 81, 83 to be freed up for a subsequent lay-up operation once the curing and transferring of the blade shells has been completed, and provides for reduced occupancy time of the blade moulds 81, 83 by the components of a single wind turbine blade. This acts to increase the productivity of a single set of blade moulds 81, 83, and provides for greater flexibility in the manufacturing process.

In the embodiment of FIG. 2, the post-moulding station 90 comprises an open-ribbed cradle structure to receive a cured blade shell from a blade moulding station, and to support said cured blade shells during post-moulding operations. It will be understood that any suitable open-framed structure may be used, which can be arranged to support a wind turbine blade shell, e.g. an open-framed lattice or truss structure. Preferably, the cradles of the post-moulding station comprise support surfaces arranged to provide cushioned support to the blade shells received in the cradles.

FIGS. 3-5 show the turning device 10 according to the invention in more detail. FIG. 3 illustrates the turning device 10 in an initial step, where the two manufacturing station parts are arranged parallel to each other (or at 0 degrees of the turning process). FIG. 4 illustrates the turning device 10 in an intermediate step, where the first manufacturing station part has been turned 90 degrees relative to the second manufacturing station part. FIG. 5 illustrates the turning device 10 in a final step, where the first manufacturing work station part has been turned 180 degrees relative to the second manufacturing station part. There may be a later closing step (not shown), where the first manufacturing station part is lowered onto the second manufacturing station part. In the figures, (a) shows a top view of the turning device 10, (b) shows a first end view of the turning device 10, (c) shows a side view of the turning device 10, (d) shows an opposing end view of the turning device 10, and (e) shows the turning device 10 in a perspective view.

The turning device 10 comprises a base part 12, which is stationary during the turning process, and a rotational part 14, which is rotational movable relative to the base part 14 about a rotation axis 16. The turning device 10 comprises one first linear actuator 18 and two second linear actuators 22 in form of hydraulic cylinders. The first linear actuator has a first end 19 and a second end 20, wherein the first end 19 is attached to the base part 12, and the second end 20 is attached to the rotational part at a first anchor point arranged on a first turning axis. Each of the second linear actuators 22 also comprises a first end 23 and a second end 24, wherein the first end 23 is attached to the base part 12 and the second end 24 is attached to the rotational part 14 at a second anchor point on a second turning axis 25. The first turning axis 21 and the second turning axis 25 are formed by a first shaft and a second shaft, respectively, and the second ends 20, 24 of the linear actuators 18, 22 are rotational coupled to said shafts so that the turning motion may be carried out. In the shown embodiment, the first ends 19, 23 of the linear actuators 18, 22 are rotational coupled to a common base shaft forming a common base axis 26. However, in general, the first end 19 of the first linear actuator 18 may be rotationally coupled to a first base axis or shaft, and the first ends 23 of the second linear actuators 22 be rotationally coupled to a second base axis or shaft.

The first turning axis 21 or shaft is arranged at a first distance $R_1$ from the rotation axis 16 such that the first turning axis 21 during the turning process is moved along a first arc of circle about the rotation axis 16, the first arc of circle having a curvature radius corresponding to $R_1$. The second turning axis 25 or shaft is arranged at a first distance $R_2$ from the rotation axis 16 such that the second turning axis 25 during the turning process is moved along a second arc of circle about the rotation axis 16, the second arc of circle having a curvature radius corresponding to $R_2$.

According to the invention, the second distance $R_2$ is different from the first distance $R_1$. The second distance $R_2$ is preferably at least 2% larger (or smaller) than the first distance $R_1$, advantageously at least 5%. In one example, the first distance $R_1$ is 450 mm, and the second distance $R_2$ is 500 mm.

The linear actuators 18, 22 are arranged axially next to each other such that they are arranged longitudinally next to each other along the manufacturing station, when the turning devices 10 are attached to the manufacturing station parts. The second linear actuators 22 are arranged on either side of the first linear actuator 18, such that the linear actuator arrangement overall provides a symmetric and balanced arrangement, thereby ensuring that the asserted forces during the turning action are balanced and distortion is minimised.

In a first sequence of the turning sequence, both the first actuator 18 and the second actuators are extended. In a second sequence, the second actuators 22 continue to be extended, whereas the first actuator 18 starts to be retracted, along the way to the position shown in FIG. 4, where the rotational part 14 is turned 90 degrees relative to the base part 12. In a third sequence, the first actuator 18 continues to be retracted, and the second actuators 22 also start to be retracted until the rotational part 14 is rotated 180 degrees relative to the base part 12 as shown in FIG. 5.

FIG. 6 compares the asserted moment of force (or torque) of the turning device during the turning process compared to a prior art turning device, where the y-axis shows the moment of force in kilo Newton metres as a function of the angular position during the turning sequence. The graphs are based on amongst others the LM73.5p wind turbine blade having a length of 73.5 meters and blade moulds as an example. The first blade mould part 81 and first blade shell part have a total weight of tens of tons, and the setup utilises a plurality of turning devices 10 according to the invention.

It is recognized that the shape of blades and hence the shape of the manufacturing station parts vary in the longitudinal direction. Accordingly, the weights of various sections of the parts also vary in the longitudinal direction. The two middle graphs denoted 100 and 110, respectively, depict the minimum moment of force necessary to turn over the first mould part and the first blade shell part during the turning sequence at two extremes in the longitudinal direction for a range of blade moulds with which the turning system may be used. The deflection points of the graphs, which are located within the first 45 degrees of the turning sequence, correspond to the point, where the first mould part 81 is rotated to a point, where the centre of gravity is at the same height as the rotation axis 16. It is seen that the centres of gravity at the two extremes are located at different positions relative to the rotation axis 16.

Graph 120 illustrates the moment of force asserted by a turning device 10 according to the invention during the closing turning sequence, i.e. the sequence from 0 degrees to 180 degrees. It is recognised that the asserted moment of force has to be higher than the minimum moment of force 100, 110 at the two extremes.

Graph 130 illustrates the moment of force during the opening turning sequence, i.e. the sequence from 180 degrees to 0 degrees and after the two shell parts have been glued together.

Graphs 140 and 150 illustrate the corresponding asserted moment of force from a prior art turning device, which comprises one first hydraulic cylinders and one second hydraulic cylinders, and where the two turning axes are arranged in the same distance from the rotation axis.

It is seen that graph 120 comprises two discontinuities or kinks 122, 124. The first discontinuity 122 corresponds to the point in the turning sequence, where the first linear actuator 18 changes from push to pull, and the second discontinuity 124 corresponds to the point, where the second linear actuators 18 change from push to pull.

The present invention has two primary advantages over the prior art turning devices. By letting the different engagement points be moved at different arcs of circle relative to the rotation axis, it is possible to design the turning device with larger degrees of movement, which in turn makes it possible to minimise the width of the device. Further, by having the second distance or second arc of circle being larger than the first distance or first arc of circle, the efficiency of the system may be increased, since the positions of the discontinuities 122, 124 to a larger degree may be tailored. Thereby, it is possible to use smaller linear actuators, which in turn makes it possible to lower the overall cost of the device. Finally, the larger degrees of movement also make it possible to let the asserted moment of force be closer to the required moment of force. Thus, the device may be designed with a lower overhead, which again makes it possible to use smaller linear actuators. Further, the use of one first linear actuator 18 and two second actuators 22 provides an additional advantage over prior art turning systems comprising an equal number of first and second actuators in that a balanced and narrower width design may be achieved.

It is seen from FIG. 6 that the turning device 10 is designed with much lower overhead than the prior art turning device and that graph 120 to a much larger degree follows the minimum moment of forces 100, 110 than graph 140, in particular for the middle part of the turning sequence, which makes it possible to use smaller dimensioned linear actuators than the prior art systems and allows the overall turning device to be narrower, which in turn lowers the cost of the turning device.

Further, it is possible to design the turning device 10 according to the invention such that the vertical position of the rotation axis during a turning sequence may be varied. This may for instance be carried out via a linear actuator or a jack, which may adjust the height of the device and/or the position of the rotation axis. Thereby, it is possible to lower the maximum height of the turning side mould part or post-moulding station part during the turning mechanism, whereby the ceiling height may be lower. This is particularly relevant for very large wind turbine blades, which today may have a length of more than 80 meters. The moulds may have a large width and a large height, especially if the moulds are for manufacturing prebent blades, which thus requires a large maximum height during the turning action. This particular embodiment is also applicable to existing prior art turning systems.

| Reference Numerals | |
|---|---|
| 10 | Turning device/turnover device/closing device |
| 12 | Base part/stationary part |
| 14 | Rotational part |
| 16 | Rotation axis |
| 18 | First linear actuator |
| 19 | First end of first linear actuator |
| 20 | Second end of first linear actuator |
| 21 | First turning axis/first turning shaft |
| 22 | Second linear actuators |
| 23 | First end of second linear actuator |
| 24 | Second end of second linear actuator |
| 25 | Second turning axis/second turning shaft |
| 26 | Common base axis/Common base shaft |
| 80 | Mould assembly/blade moulding station |
| 81 | First mould part/First blade shell mould |
| 82 | First moulding surface |
| 83 | Second mould part/Second blade shell mould |
| 84 | Second moulding surface |
| 86 | Applicator device |
| 90 | Post-moulding station |
| 91 | First cradle |
| 93 | Second cradle |
| 100 | First extreme of minimum required moment of force |
| 110 | Second extreme of minimum required moment of force |
| 120 | Asserted moment of force of turning device according to invention during closing sequence |
| 130 | Asserted moment of force of turning device according to invention during opening sequence |
| 140 | Asserted moment of force of prior art turning device during closing sequence |
| 150 | Asserted moment of force of prior art turning device during opening sequence |
| $R_1$ | First distance/First curvature radius |
| $R_2$ | Second distance/Second curvature radius |

The invention claimed is:

1. A turning device (10) for turning a first mould part (81) for manufacturing a wind turbine blade part relative to a second mould part (83) for manufacturing a wind turbine blade part or a first post-moulding station part (91) relative to a second post-moulding station part (93), wherein the turning device (10) comprises:

a base part (12), a rotational part (14), which is rotational movable relative to the base part (12) about a rotation axis (16), a first linear actuator (18) having a first end (19) and a second end (20), wherein the first end (19) is attached to the base part (12), and the second end (20) is attached to the rotational part (14) at a first anchor point arranged on a first turning axis (21), a second linear actuator (22*a*) having a first end (23) and a second end (24), wherein the first end (23) is attached to the base part (12), and the second end (24) is attached to the rotational part (14) at a second anchor point arranged on a second turning axis (25), characterised in that the first turning axis (21) is arranged at a first distance ($R_1$) from the rotation axis (16) such that the first turning axis (21) during turning is moved along a first arc of circle about the rotation axis (16), and the second turning axis (25) is arranged at a second distance ($R_2$) from the rotation axis (16) such that the second turning axis (25) during turning is moved along a second arc of circle about the rotation axis, wherein the second distance ($R_2$) is different than the first distance ($R_1$).

2. A turning device according to claim 1, wherein the first linear actuator and/or the second linear actuator are hydraulic cylinders.

3. A turning device according to claim 1, wherein the turning device comprises an additional second linear actuator having a first end and a second end, wherein the first end is attached to the base part, and the second end is attached to the rotational part at an additional second anchor point arranged on the second turning axis.

4. A turning device according to claim 1, wherein the first end of the first linear actuator is attached to a first anchor point of a first base axis, and wherein the first end of the second linear actuator is attached to a second anchor point of a second base axis, the first base axis and the second base axis optionally being a common base axis (26).

5. A turning device according to claim 1, wherein the linear actuators are arranged axially next to each other.

6. A turning device according to claim 1, wherein the first linear actuators and second linear actuators are arranged in a symmetric arrangement.

7. A turning device according to claim 1, wherein the second distance is at least 2% larger than the first distance.

8. A turning device according to claim 1, wherein the turning device is adapted to adjust the vertical position of the rotation axis during a turning sequence.

9. A turning device according claim 1, wherein the rotational part is provided with an attachment device for attachment to a first wind turbine blade mould part or a first wind turbine blade post-moulding station part, e.g. wherein the attachment device is adapted to be detachably coupled with the first wind turbine blade mould part or a first wind turbine blade post-moulding station part.

10. A turning device according to claim 1, wherein the base part is adapted to be attached to a second wind turbine blade mould part or a second wind turbine blade post-moulding station part, alternatively to the floor of a workshop.

11. A wind turbine blade part mould assembly having a longitudinal direction and comprising:
a first mould part for manufacturing a first wind turbine blade part,
a second mould part for manufacturing a second wind turbine blade part, and
a number of turning devices according to claim 1, the turning devices being arranged along the longitudinal direction of the wind turbine blade part mould assembly, wherein
the rotational parts of the turning devices are attached to the first mould part, such that the first mould part may be turned relative to the second mould part.

12. A wind turbine blade part mould assembly according to claim 11, wherein the mould assembly comprises at least two turning devices, arranged along the longitudinal direction of the wind turbine blade mould assembly with a mutual longitudinal spacing.

13. A wind turbine blade part mould assembly according to claim 11, wherein the mould assembly comprises at least three turning devices arranged along the longitudinal direction of the wind turbine blade mould assembly with a mutual longitudinal spacing.

14. A turning device according to claim 1, wherein the linear actuators comprise:
one first linear actuator having a first end and a second end, wherein the first end is attached to the base part, and the second end is attached to the rotational part at a first anchor point arranged on a first turning axis, and
two second linear actuators having a first end and a second end, wherein the first end is attached to the base part, and the second end is attached to the rotational part at a second anchor point arranged on a second turning axis.

15. A post-moulding station having a longitudinal direction and comprising:
a first cradle,
a second cradle, and
a number of turning devices according claim 1, the turning devices being arranged along the longitudinal direction of the post-moulding station, wherein
the rotational parts of the turning devices are attached to the first cradle, such that the first cradle may be turned relative to the second cradle.

* * * * *